(12) United States Patent
Cress et al.

(10) Patent No.: US 8,027,461 B1
(45) Date of Patent: Sep. 27, 2011

(54) SYSTEMS AND METHODS FOR SPLITTING TELECOMMUNICATION SIGNALS WITH REDUCED NOISE

(75) Inventors: Jared D. Cress, Deatur, AL (US); Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 979 days.

(21) Appl. No.: 11/870,979

(22) Filed: Oct. 11, 2007

(51) Int. Cl.
  *H04M 9/00* (2006.01)
(52) U.S. Cl. .............................. 379/390.02; 379/399.01
(58) Field of Classification Search ............... 379/97.02, 379/266.05, 390.02, 390.04, 398, 399.01 379/402, 413.04
See application file for complete search history.

(56) References Cited

U.S. PATENT DOCUMENTS

| | | | |
|---|---|---|---|
| 3,810,247 A | 5/1974 | Ono | |
| 4,145,716 A | 3/1979 | Uemura et al. | |
| 4,546,329 A | 10/1985 | Unger | |
| 5,374,861 A | 12/1994 | Kubista | |
| 5,742,463 A | 4/1998 | Harris | |
| 5,848,150 A | 12/1998 | Bingel | |
| 6,477,249 B1 * | 11/2002 | Williamson et al. | 379/399.01 |
| 6,563,864 B1 | 5/2003 | Ibrahim et al. | |
| 6,628,783 B1 * | 9/2003 | Van Wonterghem | 379/416 |
| 6,744,883 B1 * | 6/2004 | Bingel et al. | 379/399.01 |
| 6,819,745 B2 * | 11/2004 | Hollenbeck et al. | 379/1.03 |
| 6,895,089 B2 * | 5/2005 | Wang | 379/387.01 |
| 7,676,031 B2 * | 3/2010 | Posthuma | 379/93.28 |
| 2002/0196908 A1 * | 12/2002 | Hollenbeck et al. | 379/1.04 |
| 2003/0002636 A1 | 1/2003 | Nelson | |
| 2005/0152080 A1 | 7/2005 | Harris et al. | |
| 2005/0180080 A1 | 8/2005 | Harris | |
| 2006/0233352 A1 * | 10/2006 | Ploumen | 379/399.01 |
| 2007/0047732 A1 * | 3/2007 | Kennedy | 379/413.02 |
| 2007/0127180 A1 | 6/2007 | Lin et al. | |

OTHER PUBLICATIONS

Dr. Richard Harris, "Introduction to TBU Protection," Fultee Semiconductor Inc., Jun. 2005.
Cress, et al., U.S. Appl. No. 12/272,427, entitled, "Systems and Methods for Splitting Telecommunication Signals with Reduced Noise," filed Nov. 17, 2008.

* cited by examiner

*Primary Examiner* — Fan Tsang
*Assistant Examiner* — Akelaw Teshale
(74) *Attorney, Agent, or Firm* — Lanier Ford Shaver & Payne, P.C.; Jon E. Holland

(57) ABSTRACT

A telecommunication system has a telecommunication line for communicating a combined signal and a splitter that is coupled to the telecommunication line. The splitter has a high-pass filter, a low-pass filter, and a current limiter. The high-pass filter is configured to transmit a first component signal of the combined signal, and the low-pass filter is configured to transmit a second component signal of the combined signal. The current limiter is configured to limit a current of the second component signal thereby preventing at least one inductor in the low-pass filter from saturating.

32 Claims, 8 Drawing Sheets

_US 8,027,461 B1_

SYSTEMS AND METHODS FOR SPLITTING TELECOMMUNICATION SIGNALS WITH REDUCED NOISE

FIELD OF THE DISCLOSURE

This disclosure generally relates to splitters used to combine and separate signals in a frequency-division communication system, such as a digital subscriber line operating in a frequency band above a conventional telephone signal.

RELATED ART

For frequency division communications systems, various signal splitters are available for combining and separating a broadband signal, such as an asymmetric digital subscriber line-2+(ADSL2+) signal or other digital subscriber line (DSL) signal, and a plain old telephone service (POTS) signal wherein the signals have been combined for transmission over a twisted wire pair of a telephone cable. Such splitters generally comprise a low-pass filter for passing the low frequency components of the POTS signal to telephone equipment and a high-pass filter for passing the high frequencies of the broadband signal to a data transceiver.

In general, a conventional splitter isolates the voice and data services so that they do not interfere with one another. However, during certain events associated with normal POTS service such as ring trip, the conventional splitter may fail to provide sufficient isolation, leading to errors in the broadband data. In some applications, a higher-level communications protocol can cope with the errors by various means, such as requesting a retransmission. Other time sensitive applications are less tolerant of errors. For example, errors in a streaming video signal delivered over a DSL circuit may be observed on a video display device before retransmission can occur. In such applications, there is a need for a robust splitter that provides sufficient isolation between the POTS and DSL service under all normal loop conditions.

BRIEF DESCRIPTION OF THE DRAWING

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the figures.

DETAILED DESCRIPTION

In general, embodiments of the present disclosure pertain to signal splitting systems and methods having improved robustness against large-signal transients in a frequency-division communication system, such as when broadband data is transported on the same pair of wires as a POTS signal. Without sufficient large-signal immunity, the isolation typically provided by a conventional splitter could degrade to the point that the services interfere with one another. Audible noise may become present on the telephone, and broadband data may be lost. This disclosure focuses on the impact to the broadband service, though the POTS service will receive some benefits as well. While some broadband applications such as web surfing can easily recover from lost data, other applications, such as streaming video, operate in real time or near real time and are much less tolerant of data loss.

Figure 1:
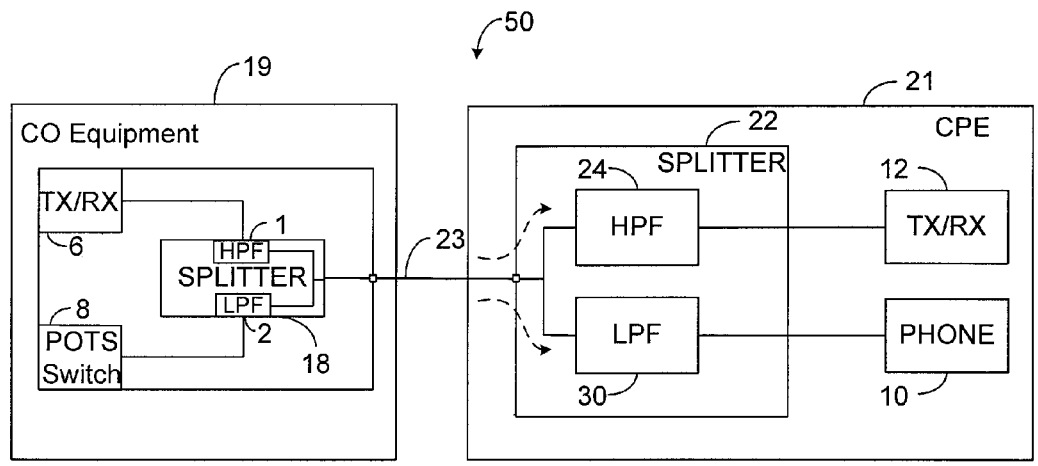
FIG. 1 is a block diagram illustrating a conventional frequency-division communication system using conventional splitters for separating telecommunication signals.

FIG. 1 shows a block diagram of an exemplary frequency division communication system 50 wherein a broadband signal, such as an ADSL2+ signal or other type of DSL signal, and a conventional phone signal (a voiceband signal or VB signal) are transported together over a common medium 23, such as a twisted wire pair. A broadband transceiver (TX/RX) 6, which comprises a data transmitter and data receiver, at a Central Office (CO) communicates with a broadband transceiver 12, which comprises a data transmitter and data receiver, at a customer premise in a high frequency band. The transceivers 6, 12 are configured to communicate DSL signals (e.g., ADSL2+). In other examples, the transceivers 6, 12 can be configured to communicate other types of data signals (e.g. VDSL2).

Many DSL signals start around 25 kHz and extend into the MHz realm. Equipment 19 at the CO comprises POTS switch 8 communicates with a telephone 10 in a low frequency band. POTS communication typically occurs in the 200 Hz to 4000 Hz band, often referred to as the voice band (VB), but supervisory signaling may produce spurious noise at higher frequencies. At the CO, a signal splitter 18 serves to isolate the POTS and DSL services from one another by feeding the appropriate frequency band to the termination equipment 6, 8 via a low-pass filter (LPF) 2 and a high-pass filter (HPF) 1 as shown. Similarly, customer premise equipment (CPE) 21 comprises a DSL transceiver 12 and a telephone 10 connected to the line 23 via a CPE splitter 22, which comprises a LPF 30 and a HPF 24, similar to the CO splitter 18.

Figure 2:
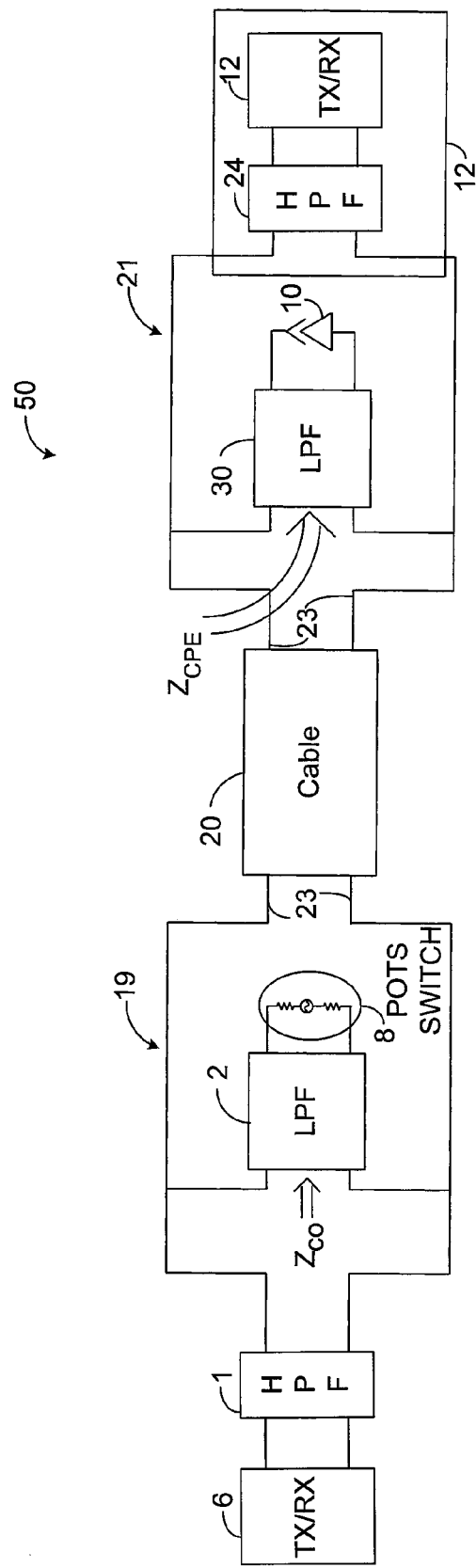
FIG. 2 is a diagram illustrating a typical instantiation of the xDSL-over-POTS system depicted in FIG. 1.

FIG. 2 shows more detail of how a conventional DSL over POTS communication system is typically implemented in practice. During an initial learning phase known as "training," the CO transceiver 6 and the CPE transceiver 12 probe the communication channel over line 23 to learn its transfer function, which is affected by things like the impedance Zco of the CO LPF 2, the characteristics of cable 20, and the impedance Zcpe of the CPE LPF 30, as well as the HPF 1, 24 associated with each modem transceiver 6, 12. While many DSL implementations can adapt to slow changes in the transfer function, it is assumed for simplicity that there will be no rapid deviations in the communication channel.

For historical reasons, POTS service employs large signals and various impedance conditions to indicate supervisory states to the far end. Neither of these mechanisms is friendly to broadband and can pose serious problems as broadband applications, such as DSL, continue to evolve. While the actual POTS voice signal is intended to be band limited from roughly 200 Hz to 4 kHz, supervisory state changes can create transient signals containing spectral content in the band employed by the broadband service. Of particular concern is the condition in which a person answers a ringing telephone 10. The circuit 8 applying the ringing requires an interval to detect the off-hook condition of the phone 10, during which time large ringing voltages are applied to a low-impedance off-hook telephone 10. Beyond just the spectral noise created by the transients associated with change from high impedance to low impedance of the phone, the resulting currents can be much larger than during other operating states.

In fact, the currents can be so large as to impair the operation of the LPFs 2, 30. Conventional splitters are passive in nature, consisting of resistors, inductors, capacitors, and perhaps protection devices. The inductors are the elements that primarily set the impedance of the LPF (Zco or Zcpe) in the DSL band. When current flows through an inductor, it creates a magnetic field proportional to the current. However, as known to those in the art, real inductors have limitations on the magnetic field intensity (also known as flux density) that they can support, beyond which the device saturates and ceases to behave inductively. If enough current flows through the inductors to cause them to saturate, isolation between the POTS and DSL service will likely be degraded and the impedance of the LPF (Zco and/or Zcpe) will likely change, disturbing the transfer function of the DSL system and ultimately causing bit errors.

Figure 3:
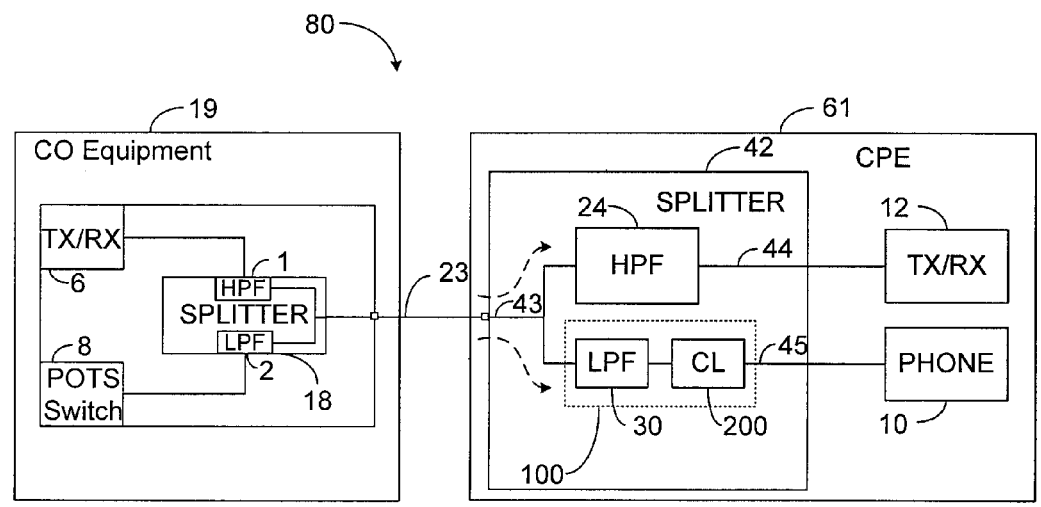
FIG. 3 is a block diagram illustrating a frequency-division communication system having a current-limited splitter in accordance with an exemplary embodiment of the present disclosure.
Figure 4:
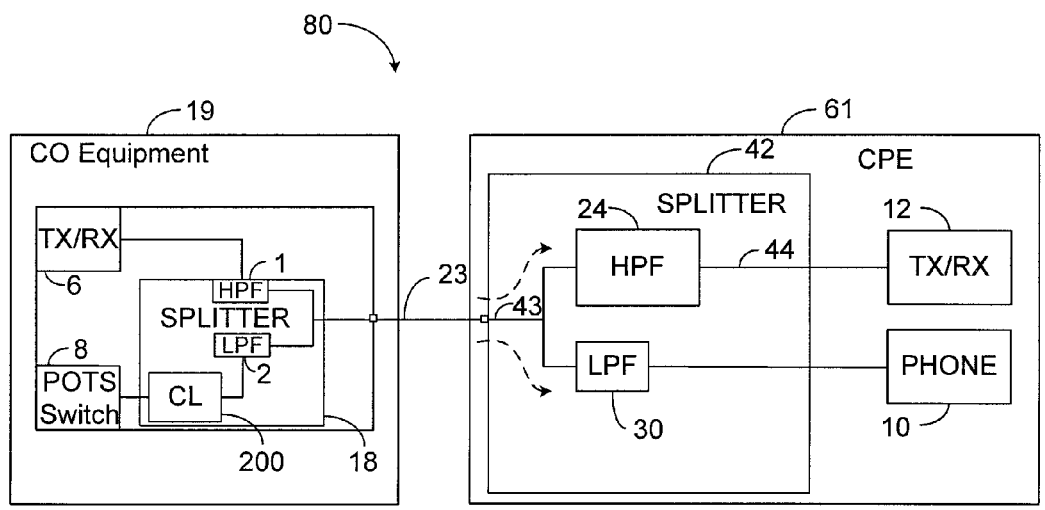
FIG. 4 is a block diagram illustrating a frequency-division communication system having a current-limited splitter in accordance with an exemplary embodiment of the present disclosure.

While particular construction details affect the maximum flux density that an inductor can handle without saturating, physical size is the primary limiting factor. It is possible to build inductors that can withstand ring trip currents without saturating, but they are generally large and do not generally minimize the energy associated with supervisory state changes. By combining a current limiter (CL) 200 with a conventional LPF 30, a current-limited LPF (CL-LPF) 100 can be realized as indicated in FIG. 3. With a CL-LPF 100, transient energy from POTS supervisory signals is reduced and inductors in both the CO LPF 2 and the CPE LPF 30 are simultaneously protected from saturation. Moreover, by reducing impedance fluctuations in the LPFs that would otherwise occur due to high current transients, the current limiter 200 reduces disturbances to the transfer function between the transceivers 6, 12 as compared to a system that does not employ a current limiter 200 as described. Further, a single CL 200, whether used at the CO or CPE, allows the use of relatively small inductors in both the CO LPF 2 and the CPE LPF 30, which is in itself a significant advantage to telecommunications providers and equipment manufacturers as space is at a premium. Note that a CL-LPF could alternatively be created at the CO by placing a CL 200 between the CO LPF 2 and the POTS switch 8, as shown by FIG. 4, though longitudinal balance would be more critical in this configuration.

Figure 5:
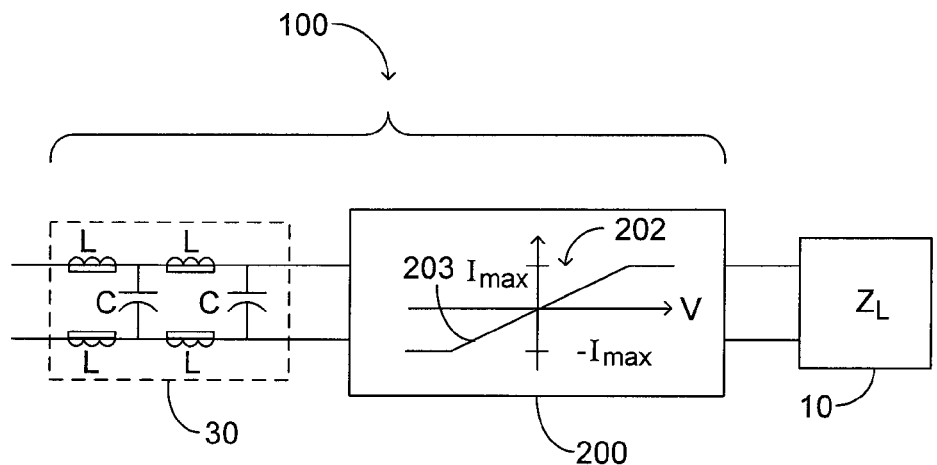
FIG. 5 is a circuit diagram illustrating an embodiment of a current limiter depicted in FIG. 3 or FIG. 4 using depletion-mode metal-oxide field effect transistors (MOSFET).

FIG. 5 illustrates a conceptual embodiment of a current-limited LPF (CL-LPF) 100 in accordance with the present disclosure. The LPF 30, shown in a representative ladder arrangement of inductors (L) and capacitors (C), is coupled in series with the current limiter 200. The phone 10 is represented by load impedance, $Z_L$. The current limiter 200 has characteristics illustrated by the voltage-current curve 202 in FIG. 5. An examination of curve 202 shows that for small values of current, the limiter 200 has a fixed value of resistance shown by the slope 203 of curve 202. When the current reaches a threshold value, $I_{max}$ (positive or negative), then the current is clamped to that value. A maximum current value of around 110 mA (milliamperes) will allow normal delivery of POTS while allowing relatively small inductors to be used with the LPFs 2, 30 of both the CO and CPE. Although 110 mA is a preferred value for one embodiment of the present disclosure, other values may be used for $I_{max}$.

Figure 6:
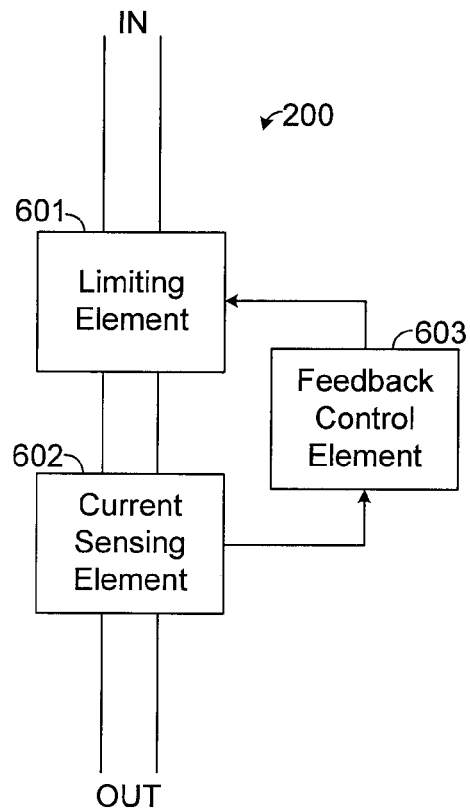
FIG. 6 is a block diagram illustrating an exemplary current limiter, such as is depicted in FIG. 3 or FIG. 4.

Known or future-developed current limiters may be used to implement the current limiter 200, though conventional current limiters may interfere with POTS service in some way. An exemplary embodiment of a current limiter (CL) 200 is disclosed herein, with a block diagram of such a limiter 200 shown in FIG. 6. Conceptually, the limiter 200 comprises several elements, the first of which is a limiting element 601, also known as a pass device, which acts to restrict the flow of current. The limiting element 601 is modulated by a feedback control element 603 such that it presents the impedance necessary to achieve the desired limiting function. The current sensing element 602 monitors the current actually flowing through the current limiter 200 at any given time as the input to the feedback control element 603.

Exemplary embodiments of the current limiter 200 are shown in FIG. 7 through FIG. 10. The embodiments of the current limiter 200 described herein utilize metal-oxide field effect transistors (MOSFETs or FETs) as the limiting element, a resistor as the current sensing element, and a Bipolar Junction Transistor (BJT) for feedback control, although other types of components may be used in other embodiments.

Figure 7:
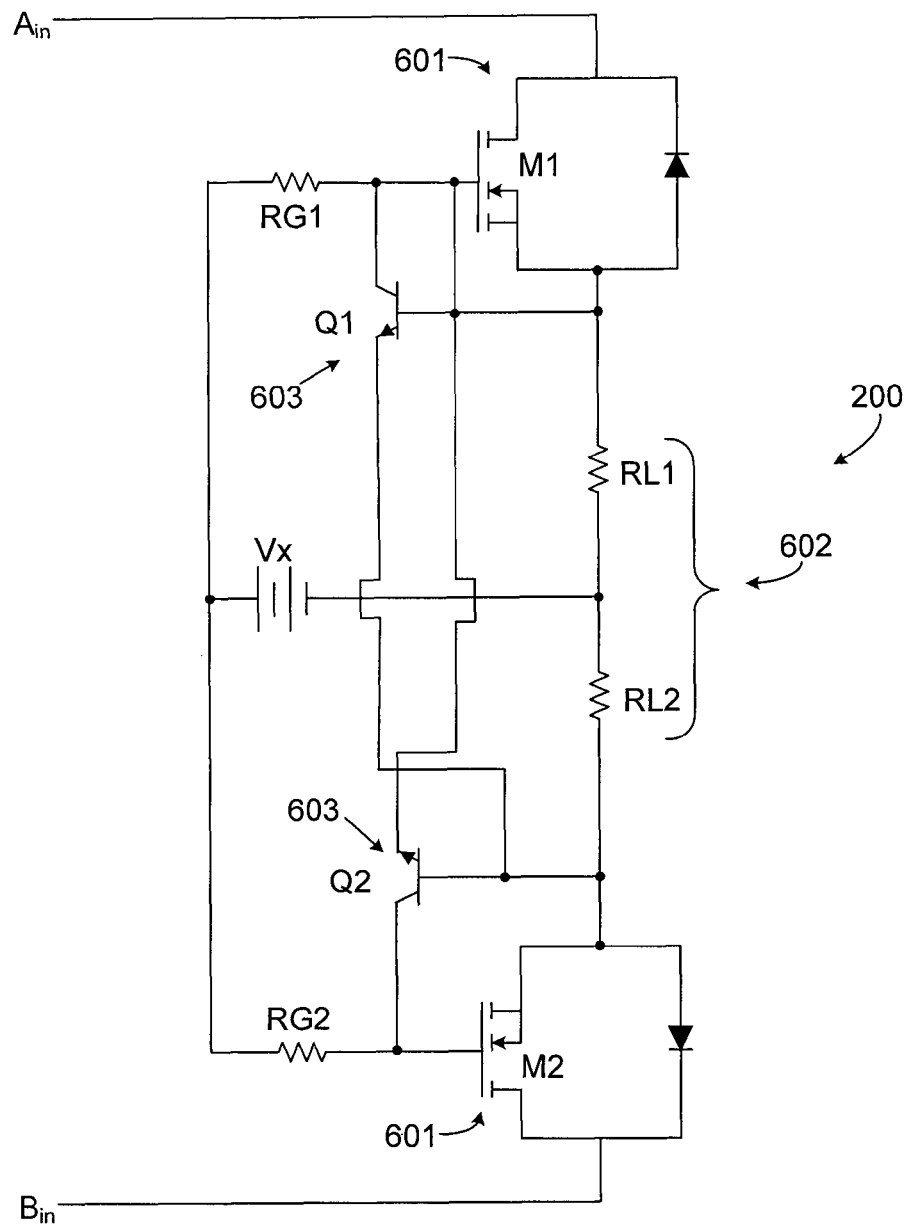
FIG. 7 is a circuit diagram illustrating an exemplary embodiment of a current limiter, such as is depicted in FIG. 3 or FIG. 4, using enhancement-mode MOSFETs.

FIG. 7 shows a CL 200 based on enhancement mode FETs M1 and M2 as the limiting elements 601. A voltage source Vx supplies gate-to-source voltage (Vgs) for the FETs M1 and M2, placing them in a normally conductive, low-impedance state. Resistors RL1 and RL2 form the current sensing element 602, while BJTs Q1 and Q2 close the feedback control loop 603. Consider the case where node Ain is at a positive potential with respect to node Bin such that conventional current flows from Ain to Bin. When the current through the sensing element 602 develops enough voltage to turn on the base-emitter junction (Vbe(on)) of Q1, Q1 begins to conduct, stealing gate drive from the FET M1. This increases the impedance of FET M1, decreasing the current that flows. Q1 continues to steal M1's gate drive until the voltage developed across the current sensing element 602 reaches exactly Vbe (on) of Q1, completing the feedback control 603 to M1, the limiting element 601. For this polarity of current flow, Q2 remains off, leaving M2 in its low-impedance state. M1 and Q1 are the active limiting element 601 and feedback control element 603, respectively, for this polarity. When the voltage across the sensing element 602 drops below Vbe(on) of Q1, Q1 quits conducting, restoring gate drive to the FET M1 and placing it back in a low-impedance state. Due to the symmetry of the circuitry, for the opposite polarity of input such that current flows from Bin to Ain, the principles of the circuit's operation are exactly the same with M2 serving as the limiting element 601 and Q2 serving as the feedback control element 603.

In the normally conductive state, this embodiment of a CL 200 has a total insertion resistance of (RL1+RL2+RMOS1+ RMOS2) where RMOS1 and RMOS2 are the drain-to-source on resistance of FETs M1 and M2 respectively. The maximum current (Imax) allowed by the device (Imax) is Vbe(on)/ (RL1+RL2). For a current limit of 110 mA, a reasonable value, RL1+RL2 would be about 4.53 ohms as Vbe(on) will be approximately 0.5 Volts for small collector currents. Typical FET devices such as International Rectifier's IRF730 put RMOS1 and RMOS2 at roughly 1 ohm each. This makes for a total insertion resistance of less than 7 ohms.

Low insertion resistance is highly desirable, as additional resistance decreases the supervisory range of the POTS service and adds additional attenuation to the voiceband (VB) signals. The architecture of FIG. 7 has no deadband in the pass function that would otherwise add crossover distortion to the VB signal. As known in the art, crossover distortion generally refers to distortion caused by line voltages close to zero when the line voltage is transitioning from a positive voltage to a negative voltage or vice versa. Such distortion is typically cause by transistors turning off when the line voltage falls below the critical biasing value (Vbe(on) for BJT, Vgs for FET).

The symmetry of the instant embodiment ensures that it will perform equally well for either polarity of input signal. The action of the feedback control element 603 makes the current limit independent of various characteristics of the limiting element 601, such as the gate-to-source threshold voltage of the FETs used to implement the element 601.

Figure 8:
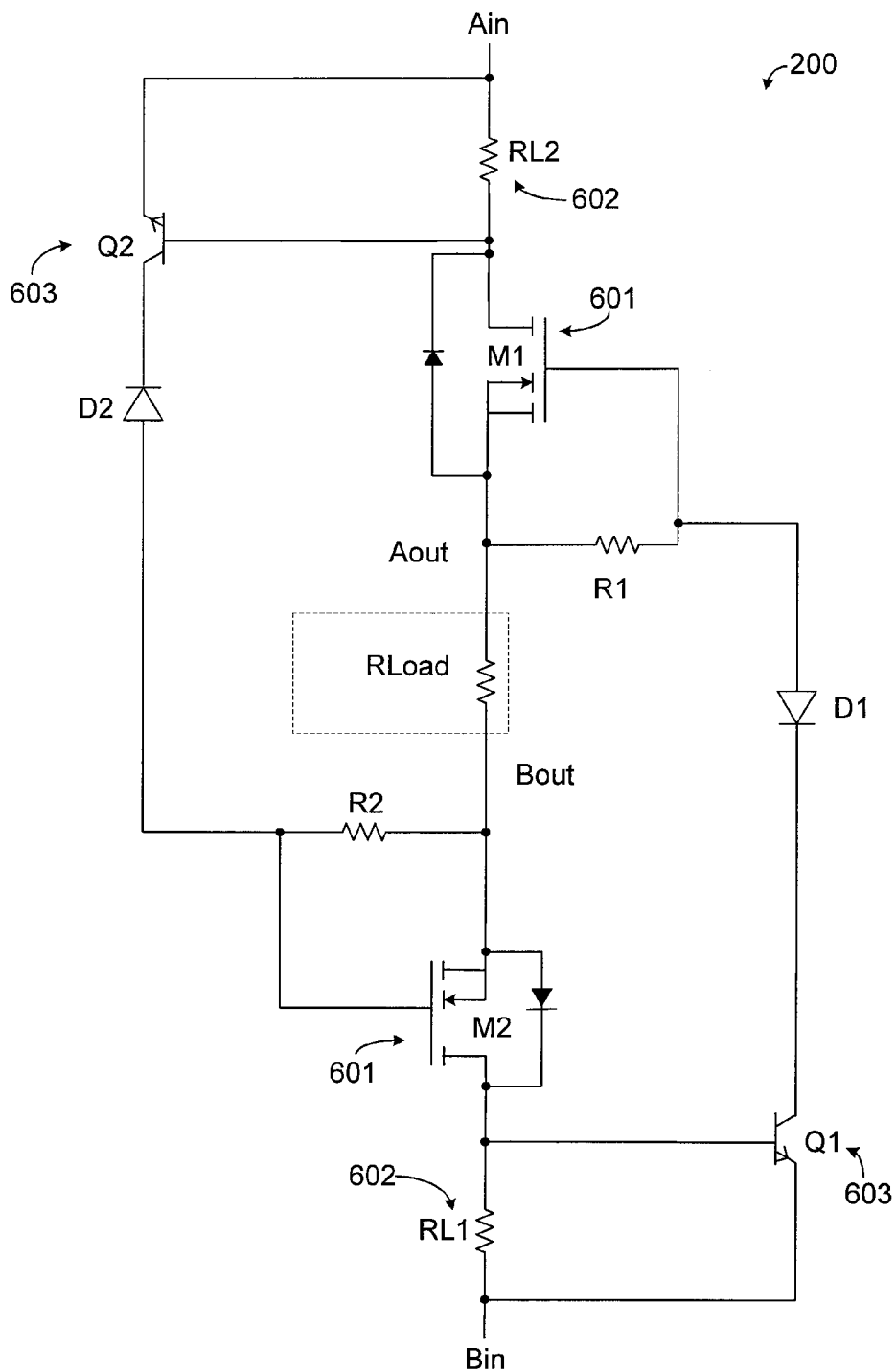
FIG. 8 is a circuit diagram illustrating an exemplary embodiment of a current limiter, such as is depicted in FIG. 3, using depletion-mode MOSFETs.

FIG. 8 shows an alternative embodiment based on depletion-mode MOSFETs M1 and M2 as the limiting element 601. This embodiment removes the need for voltage source Vx of FIG. 7, as depletion-mode FETs are in their low-impedance conductive state when there is no gate-to-source voltage. Rload represents the load, such as a telephone 10, and is not part of the current limiter 200. Considering the scenario where current is flowing from Ain to Bin, M1 serves as the limiting element 601, a resistor RL1 serves as the current sensing element 602, and a BJT Q1 serves as the feedback control element 603. For small currents, BJTs Q1 and Q2 are both off and resistors R1 and R2 ensure that there is no voltage drop between the gate and source of either M1 or M2. Thus, M1 and M2, being depletion-mode devices, are in their low-impedance conductive state. When sufficient current flows through RL1 to develop enough voltage to turn on the base-emitter junction (Vbe(on)) of Q1, Q1 conducts, pulling the gate of M1 negative with respect to its source. This increases the impedance of the FET M1, decreasing the current that flows until the feedback loop reaches a steady state condition. For this embodiment, it is desirable for Imax*(Rload+RMOS2+RL1)>=Vgs(M1), where Vgs(M1) is the threshold voltage of M1 and RMOS2 is the drain-to-source resistance of M2 in its fully conductive state (Vgs=0). This condition ensures that there is sufficient gate drive available for M1 to reach a high enough impedance to limit the current for any input voltage. For this polarity of current flow, BJT Q2 remains off, leaving M2 in its low-impedance state. M1 and Q1 are the active limiting element 601 and feedback control element 603 for this polarity. When the voltage across the RL1 sensing element 602 drops below Vbe(on) of Q1, Q1 quits conducting, placing M1 back in a low-impedance state. Due to the symmetry of the circuitry, for the opposite polarity of input such that current flows from Bin to Ain, the principles of the circuit's operation are exactly the same with M2 serving as the limiting element 601, resistor RL2 serving as the current sensing element, 602 and BJT Q2 serving as the feedback control element 603.

In the normally conductive state, this embodiment of a CL 200 has a total insertion resistance of (RL1+RL2+RMOS1+RMOS2) where RMOS1 and RMOS2 are the drain-to-source on resistance of FETs M1 and M2 respectively. The maximum current (Imax) allowed by the device is Vbe(on)/(RLx), where x is 1 or 2 depending on the polarity. For the representative case of Imax=110 mA, RLx would be about 4.53 ohms as Vbe(on) will be approximately 0.5 Volts for small collector currents. Typical depletion-mode FET devices such as Supertex DN3535 put RMOS1 and RMOS2 have roughly 10 ohms each. This makes for a total insertion resistance of approximately 30 ohms. When Ain is positive with respect to Bin, diode D2 ensures that no current bypasses the load via the base-collector junction of Q2. Diode D1 serves the same function for Q1 for the opposite polarity of input signal.

Figure 9:
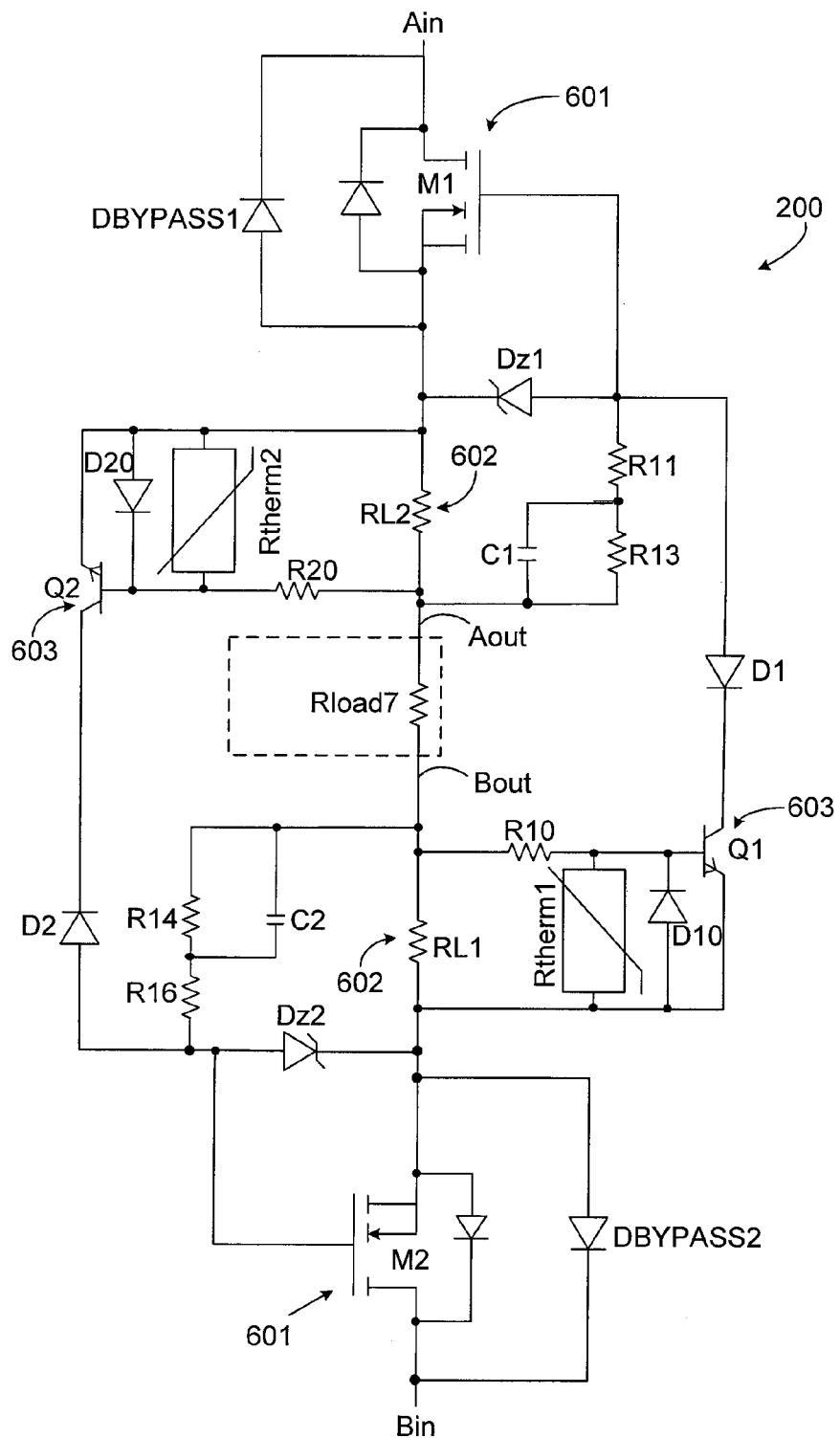
FIG. 9 is a circuit diagram illustrating an exemplary embodiment of a current limiter, such as is depicted in FIG. 3, using depletion-mode MOSFETs.

Additional modifications to the current limiter 200 are possible. For the embodiment of FIG. 8, the feedback control element 603 is implemented via a BJT transistor. As known to those in the art, Vbe(on) of a BJT varies with temperature at a rate of approximately—2 mV/degree Centigrade, causing Imax to vary with temperature as well. Other feedback control instantiations may not have a temperature dependence, but in this case, FIG. 9 shows an exemplary configuration that compensates for temperature variance such that Imax does not vary with temperature. By choosing appropriate values, the voltage divider feeding the base-emitter junction of BJT Q1, formed by resistor R10 and Rtherm1, varies at an effective rate of +2 mV/degree Centigrade, where Rtherm1 is a negative temperature coefficient (NTC) thermistor. The net result is that the current required, Imax, to activate the feedback control element 603 is independent of temperature. Similar compensation is accomplished for BJT Q2 by the addition of resistor R20 and Rtherm2, which is an NTC thermistor. Compensation can be accomplished for the CL 200 based on enhancement-mode FETs via similar changes to the embodiment shown in FIG. 7.

FIG. 9 also shows an additional modification that protects the CL 200 from large AC over-voltage conditions such as those that might be experienced during a 60 Hz power fault. During normal operation, nodes Ain and Aout are connected via a low impedance (RL2+RMOS1), and are, therefore, at very nearly the same potential for small signal operation. During a fault condition, though, large voltages could potentially be forced across the Ain to Aout nodes. Should the voltage at node Ain become sufficiently negative relative to Aout, capacitor C1 charges via resistor R11, zener diode DZ1, and diode Dbypass1. During the half-cycle of the AC fault where Ain is positive with respect to Aout, the stored charge on C1 shuts off M1 so that M1 is not dissipating large amounts of power, thereby protecting the current-limiter 200 from component failure. The charge on C1 is replenished every negative half-cycle, keeping M1 turned off for the duration of the fault. In this way, M1 is not exposed to abusive amounts of power during a fault condition. When the fault is removed, C1 discharges, M1 returns to a low-impedance state, and normal operation resumes. Capacitor C2, zener diode DZ2, and diode Dbypass2 provide similar protection to M2 that can be understood via the symmetry of the circuit.

Diode Dbypass1 sits in parallel with the integrated source-to-drain diode of M1. The integrated FET diode in many readily available parts is small and not intended to carry large currents. As Dbypass1 is larger, it turns on at a lower voltage, thus carrying the majority of the current and protecting such integrated diodes from damage. Dz1 protects the gate-to-source junction of M1 from damaging voltages, and also provides a path to charge capacitor C1. Diode D10 protects the base-to-emitter junction of Q1 from excessive reverse voltages.

Diode Dbypass2 sits in parallel with the integrated source-to-drain diode of M2. As Dbypass2 is larger, it turns on at a lower voltage, thus carrying the majority of the current and protecting such integrated diodes from damage. Dz2 protects the gate-to-source junction of M2 from damaging voltages, and also provides a path to charge capacitor C2. Diode D20 protects the base-to-emitter junction of Q2 from excessive reverse voltages.

Figure 10:
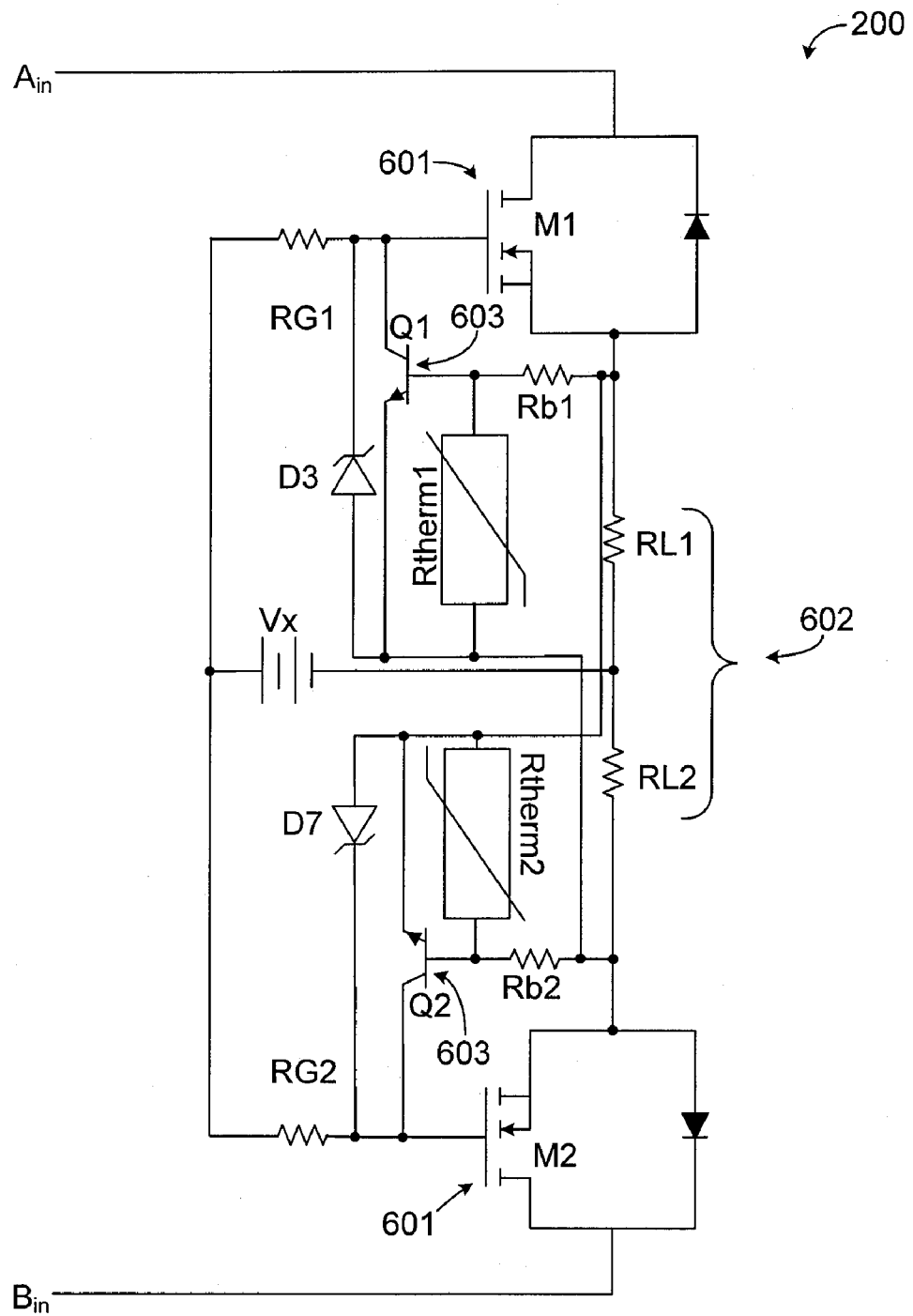
FIG. 10 is a circuit diagram illustrating an exemplary embodiment of a current limiter, such as is depicted in FIG. 3, using enhancement-mode MOSFETs.

FIG. 10 is an exemplary configuration using enhancement-mode FETs. The embodiment shown by FIG. 10 is identical to that shown by FIG. 7 except that various components have been added for providing circuit protection and compensating for temperature fluctuations as described above for the embodiment depicted by FIG. 9. In particular, temperature dependent thermistors Rtherm1, Rtherm2 have been added to compensate for temperature fluctuations, and zener diodes D3, D7 have been added to protect the circuit from damaging voltages.

In the embodiments shown by FIGS. 7-10, it can be observed that the components of the current limiter 200 are not connected to a reference voltage (e.g., the load's ground). Indeed, the voltages of the current limiter components float with the line voltage enabling the current limiter to handle a wide range of voltages.

While the embodiments of the present disclosure have been described in detail, it is to be expressly understood that it will be apparent to persons skilled in the relevant art that the embodiments may be modified without departing from the spirit of the disclosure. Various changes of form, design or arrangement may be made to the disclosure without departing from the spirit and scope of the disclosure.

What is claimed is:

1. A splitter for use in a telecommunication system, the splitter comprising:
a first path coupled to a telecommunication line, the first path having a first filter; and
a second path coupled to the telecommunication line, the second path having a second filter and a current limiter, the second filter coupled in cascade with the current limiter, wherein the current limiter comprises a current limiting element, a current sensing element, and a feedback control element, wherein the feedback control element is coupled to the current sensing element and the current limiting element, wherein the feedback control element is configured to transmit a feedback signal to the current limiting element based on a current from the telecommunication line sensed by the current sensing element, and wherein the current limiter is configured to transition the current limiting element to an open circuit state when a voltage of the telecommunication line exceeds a threshold thereby preventing the current from passing though the current limiting element during a fault on the telecommunication line,
wherein the first filter is configured to filter signals in a first frequency band, and wherein the second filter is configured to filter signals in a second frequency band different than the first frequency band.

2. The splitter of claim 1, wherein the second path is coupled to plain old telephone service (POTS) equipment, and wherein the first path is coupled to a broadband receiver.

3. The splitter of claim 1, wherein the current limiter is bi-directional.

4. The splitter of claim 1, wherein the current limiting element comprises at least one depletion-mode metal-oxide semiconductor field-effect transistor.

5. The splitter of claim 1, wherein the current limiting element comprises at least one enhancement-mode metal-oxide semiconductor field-effect transistor.

6. The splitter of claim 1, wherein the second filter comprises at least one inductor, and wherein the current limiter is configured to limit the current such that saturation of the at least one inductor is prevented.

7. The splitter of claim 1, wherein the splitter is configured to receive a combined signal comprising a broadband signal that has been combined with a telephone signal.

8. The splitter of claim 7, wherein the first filter is configured to recover the broadband signal and the second filter is configured to recover the telephone signal, wherein a broadband receiver is configured to receive the broadband signal, and wherein the current limiter is configured to limit the current such that coupling of high-frequency noise from the telephone signal to the broadband receiver is reduced.

9. The splitter of claim 1, wherein the current limiter has a temperature dependent component for compensating for temperature fluctuations.

10. The splitter of claim 1, wherein the current limiter has no deadband that causes crossover distortion.

11. The splitter of claim 1, wherein each component of the current limiter has a voltage that floats with a voltage of the telecommunication line.

12. The splitter of claim 1, wherein the current limiting element comprises a transistor coupled to the telecommunication line, and wherein the current limiter is configured to turn off the transistor when the voltage of the telecommunication line exceeds the threshold thereby preventing the current from passing though the current limiting element during the fault.

13. The splitter of claim 12, wherein the current limiter comprises a capacitor, wherein the current limiter is configured to turn the transistor off in response to a stored charge on the capacitor when the voltage of the telecommunication line exceeds the threshold, and wherein the capacitor is configured to discharge when the voltage of the telecommunication line falls below the threshold thereby allowing the current to pass through the current limiting element.

14. The splitter of claim 1, wherein the current limiter is configured to automatically transition the current limiting element from the open circuit state to a conductive state after the voltage falls below the threshold such that current flows through the current limiting element.

15. The splitter of claim 1, further comprising a load coupled in cascade with the current limiter, wherein the current limiter comprises a transistor that is configured to transition to an open circuit state when the voltage of the telecommunication line exceeds the threshold, and wherein a voltage drop across the load drives a gate of the transistor.

16. The splitter of claim 1, wherein the first filter is a high-pass filter, and wherein the second filter is a low-pass filter.

17. A communication system, comprising:
a telecommunication line for communicating a combined signal, the combined signal comprising a first component signal and a second component signal; and
a splitter coupled to the telecommunication line, the splitter having a first filter, a second filter, and a current limiter, the first filter configured to transmit the first component signal and the second filter configured to transmit the second component signal, the current limiter configured to limit a current of the second component signal thereby preventing at least one inductor in the second filter from saturating, wherein the first component signal is in a first frequency band and the second component signal is in a second frequency band different than the first frequency band, wherein the current limiter comprises a current limiting element, a current sensing element, and a feedback control element, wherein the feedback control element is coupled to the current sensing element and the current limiting element, wherein the current sensing element is configured to sense the current of the second component signal, wherein the feedback control element is configured to transmit a feedback signal to the current limiting element based on the current sensing element, and wherein the current limiter is configured to transition the current limiting element to an open circuit state when a voltage of the telecommunication line exceeds a threshold thereby preventing the current of the second component signal from passing though the current limiter during a fault on the telecommunication line.

18. The system of claim 17, wherein the current limiter is bi-directional.

19. The system of claim 17, wherein the first component signal is a broadband signal and the second component signal is a telephone signal, and wherein the system further comprises:
   a broadband receiver configured to receive the broadband signal; and
   a telephone configured receive the telephone signal.

20. The system of claim 17, wherein the current limiter comprises a capacitor, wherein the current limiting element is configured to transition to the open circuit state in response to a stored charge on the capacitor, and wherein the capacitor is configured to discharge after the fault thereby allowing the current of the second component signal to pass through the current limiting element.

21. The system of claim 17, wherein the current limiter is configured to automatically transition the current limiting element from the open circuit state to a conductive state after the fault.

22. The system of claim 17, wherein the first filter is a high-pass filter, and wherein the second filter is a low-pass filter.

23. A splitter for use in a telecommunication system that communicates a combined signal over a telecommunication line, the combined signal comprising a first signal in a first frequency band and a second signal in a second frequency band, the splitter comprising:
   a first path for transmitting the first signal, the first path having a first filter configured to allow the first signal to pass and to prevent the second signal from passing; and
   a second path for transmitting the second signal, the second path having a second filter and a current limiter in cascade with the second filter for reducing transient energy in the combined signal such that noise in the first signal is reduced, wherein the second filter is configured to allow the second signal to pass and to prevent the first signal from passing, wherein the current limiter comprises a current limiting element, a current sensing element, and a feedback control element, wherein the feedback control element is coupled to the current sensing element and the current limiting element, wherein the current sensing element is configured to sense the current of the second signal, wherein the feedback control element transmits a feedback signal to the current limiting element based on the current sensing element, and wherein the current limiter is configured to control the current limiting element such that the current of the second signal is prevented from passing through the current limiting element when a voltage of the telecommunication line exceeds a threshold.

24. The splitter of claim 23, wherein the second path is coupled to a telephone.

25. The splitter of claim 23, wherein the current limiter prevents at least one inductor in the second filter from saturating.

26. The splitter of claim 23, wherein the current limiter comprises a capacitor, wherein the current of the low-frequency signal is prevented from passing through the current limiting element in response to a stored charge on the capacitor, and wherein the capacitor is configured to discharge after the voltage of the telecommunication line falls below the threshold allowing the current of the low-frequency signal to pass through the current limiting element.

27. The splitter of claim 23, wherein the current limiter is configured to automatically control the current limiting element such that the current of the low-frequency signal is allowed to pass through the current limiting element after the voltage of the telecommunication line falls below the threshold.

28. The splitter of claim 23, wherein the first filter is a high-pass filter, and wherein the second filter is a low-pass filter.

29. A method for use in a telecommunication system, comprising the steps of:
   receiving a combined signal from a telecommunication line, the combined signal having a first signal in a first frequency band combined with a second signal in a second frequency band;
   filtering signals in the first frequency band via a first filter of a splitter;
   filtering signals in the second frequency band via a second filter of the splitter, wherein the first frequency band is different than the second frequency band;
   splitting the combined signal into the first signal and the second signal via the splitter, wherein the splitting step comprises the steps of filtering the combined signal via the first filter and filtering the combined signal via the second filter;
   transmitting the first signal from the first filter to a first receiver; and
   limiting, via a current limiter coupled in cascade with the second filter, a current of the second signal, wherein the limiter comprises a current limiting element, a current sensing element, and a feedback control element, and wherein the feedback control element is coupled to the current limiting element and the current sensing element;
   transmitting the second signal from the second filter to a second receiver;
   sensing a current from the telecommunication line via the current sensing element;
   transmitting a feedback signal from the feedback control element to the current limiting element based on the sensed current, wherein the limiting step is based on the feedback signal; and
   transitioning the current limiting element to an open circuit state when a voltage of the telecommunication line exceeds a threshold thereby preventing current from passing through the current limiting element during a fault condition on the telecommunication line.

30. The method of claim 29, wherein the limiting step is performed such that saturation of at least one inductor in the low-pass filter is prevented.

31. The method of claim 29, further comprising the steps of:
   charging a capacitor after the voltage of the telecommunication line exceeds the threshold, wherein the transitioning step is performed in response to the charging step; and discharging the capacitor when the voltage of the telecommunication line falls below the threshold thereby permitting current to flow through the current limiting element.

32. The method of claim 29, further comprising, subsequent to the transitioning step, automatically controlling the current limiter based on the voltage of the telecommunication line such that current is allowed to flow through the current limiting element after the voltage of the telecommunication line falls below the threshold.

* * * * *